US009422712B2

(12) United States Patent
Miller (10) Patent No.: US 9,422,712 B2
(45) Date of Patent: *Aug. 23, 2016

(54) TEMPERATURE CONTROLLED VARIABLE REFLECTIVITY COATINGS (71) Applicant: Empire Technology Development LLC, Wilmington, DE (US)

(72) Inventor: Seth Miller, Englewood, CO (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/975,282

(22) Filed: Aug. 23, 2013

(65) Prior Publication Data
US 2014/0011017 A1 Jan. 9, 2014

Related U.S. Application Data (62) Division of application No. 13/130,818, filed as application No. PCT/US2011/026610 on Mar. 1, 2011, now Pat. No. 8,541,094.

(51) Int. Cl.
*E04B 1/74* (2006.01)
*B05D 5/06* (2006.01)
(Continued)

(52) U.S. Cl.
CPC . *E04B 1/74* (2013.01); *B05D 5/063* (2013.01); *B05D 7/54* (2013.01); *E04D 13/00* (2013.01);
(Continued)

(58) Field of Classification Search
CPC .............................................. Y10T 428/24802
See application file for complete search history.

(56) References Cited

U.S. PATENT DOCUMENTS 4,192,311 A   3/1980 Felfoldi
5,026,364 A   6/1991 Robertson
(Continued)

FOREIGN PATENT DOCUMENTS

EP      765922 A1    4/1997
EP     1156099 A2   11/2001
(Continued)

OTHER PUBLICATIONS

"Superabsorbent Polymer", http://en.wikipedia.org/wiki/Superabsorbent_polymer, Date retrieved Dec. 17, 2010.
(Continued)

*Primary Examiner* — Gerard Higgins
*Assistant Examiner* — Sathavaram I Reddy
(74) *Attorney, Agent, or Firm* — Turk IP Law, LLC (57) ABSTRACT Coatings configured to change between a relatively higher reflectivity state and a relatively lower reflectivity state depending at least partially upon temperature are generally disclosed. Some example coatings may include a selectively reflective layer including a plurality of microcapsules, which may include an ionic liquid and/or a surfactant within a shell. The microcapsules may have a relatively higher reflectivity when at temperatures above a cloud transition temperature and/or a relatively lower reflectivity when at temperatures below the cloud transition temperature. When at temperatures above the cloud transition temperature, the selectively reflective layer may reflect a first fraction of the incident light. When at temperatures below the cloud transition temperature, the selectively reflective layer may reflect a second fraction of the incident light. The first fraction of the incident light may be greater than the second fraction of the incident light.

19 Claims, 5 Drawing Sheets (51) Int. Cl.
*B05D 7/00* (2006.01)
*G02B 5/02* (2006.01)
*G02B 7/00* (2006.01)
*E04D 13/00* (2006.01)
*B05D 1/00* (2006.01)
*B05D 1/02* (2006.01)
*B05D 1/28* (2006.01)

(52) U.S. Cl.
CPC .............. *G02B 5/0226* (2013.01); *G02B 7/008* (2013.01); *B05D 1/02* (2013.01); *B05D 1/28* (2013.01); *Y10T 29/49885* (2015.01); *Y10T 428/24802* (2015.01); *Y10T 428/25* (2015.01); *Y10T 428/254* (2015.01); *Y10T 428/26* (2015.01); *Y10T 428/2984* (2015.01)

(56) References Cited

U.S. PATENT DOCUMENTS

| | | |
|---|---|---|
| 5,615,040 A | 3/1997 | Watanabe |
| 5,804,297 A | 9/1998 | Colvin et al. |
| 5,851,611 A | 12/1998 | Guttag |
| 5,928,803 A | 7/1999 | Yasuda |
| 6,020,989 A | 2/2000 | Watanabe |
| 6,287,679 B1 | 9/2001 | Pappas et al. |
| 6,475,556 B1 | 11/2002 | Sobczak et al. |
| 6,500,555 B1 | 12/2002 | Khaldi |
| 7,163,726 B2 | 1/2007 | Watanabe |
| 8,163,207 B2 | 4/2012 | Jung et al. |
| 8,182,718 B2 | 5/2012 | Byker et al. |
| 2005/0004175 A1 | 1/2005 | Nakamura et al. |
| 2005/0064175 A1 | 3/2005 | Azari et al. |
| 2007/0082817 A1 | 4/2007 | Kivley |
| 2009/0258555 A1 | 10/2009 | Flautt et al. |
| 2010/0003518 A1 | 1/2010 | Grey |
| 2011/0013252 A1 | 1/2011 | Archambeau et al. |
| 2011/0026610 A1 | 2/2011 | Stevens et al. |
| 2011/0206836 A1 | 8/2011 | Wen et al. |
| 2012/0189820 A1 | 7/2012 | Hakim et al. |

FOREIGN PATENT DOCUMENTS

| | | |
|---|---|---|
| WO | 0060407 A1 | 10/2000 |
| WO | 0123173 A1 | 4/2001 |
| WO | 0208540 A | 1/2002 |
| WO | 2007130709 A2 | 11/2007 |

OTHER PUBLICATIONS

"Thermochromism", http://en.wikipedia.org/wiki/Thermochromism, Date retrieved Dec. 28, 2010.

"2006 U.S. Buildings Energy End-Use Splits", http://buildingsdatabook.eren.doe.gov/ChartView.aspx?chartID=O, U.S. Department of Energy, Buildings Energy Data Book, Date retrieved Dec. 28, 2010.

"Cloud point", http://en.wikipedia.org/wiki/Cloud_point, Dec. 2005.

Inoue et al., "Cloud point phenomena of polyoxyethylene-type surfactants in ionic liquidmixtures of emimBF4 and hmimBF4", Journal of Colloid and Interface Science, pp. 522-528, vol. 348, Elsevier, Amsterdam, The Netherlands, Apr. 2010.

International Search Report and Written Opinion for PCT/US2011/026619, filed Mar. 1, 2011, mailed May 4, 2011.

Ma et al., "Preparation of Reversable Thermochrornic Building Coatings and Their Properties", Journal of Coatings Technology, pp. 67-71, vol. 72, Germany, Dec. 2000.

Yang et al, "Monodispersed microcapsules enclosing ionic liquid of 1-butyl-3-methylimidazolium hexaflurophosphate", Reactive & Functional Polymers, vol. 67, pp. 81-86, Jan. 2007.

Giles et al., "Extrusion: The Definitive Processing Guide and Handbook", Polymer Structure, pp. 179-187, Jan. 2005.

Jacoby, Mitch, "Ionic-Liquid Solar Cells", Chemical & Engineering News, Jul. 2, 2008; http:/pubs.acs.org/cen/news/86/i27/8627news4.html—Retrieved Dec. 28, 2010.

International Preliminary Report on Patentability for PCT/US2011/026610 filed Mar. 1, 2011, mailed on Sep. 12, 2013, issued Sep. 3, 2013.

A method of applying a coating, the coating being configured to change between a relatively higher reflectivity state and a relatively lower reflectivity state depending at least partially upon a temperature of at least a portion of the coating applying a selectively reflective layer on a generally light-absorbent base layer, the selectively reflective layer comprising a plurality of microcapsules disposed between a source of incident light and the generally light-absorbent base layer, individual microcapsules comprising an ionic liquid and a surfactant within a shell, the microcapsules having a relatively higher reflectively when at temperatures above a cloud transition temperature and a relatively lower reflectivity when at temperatures below the cloud transition temperature

502 when at temperatures above the cloud transition temperature, the selectively reflective layer reflects a first fraction of the incident light when at temperatures below the cloud transition temperature, the selectively reflective layer reflects a second fraction of the incident light, the first fraction of incident light being greater than the second fraction of incident light

FIG. 5

TEMPERATURE CONTROLLED VARIABLE REFLECTIVITY COATINGS

CROSS-REFERENCE TO RELAXED APPLICATIONS

This Application is a divisional under 35 U.S.C. §121 of and claims priority under 35 U.S.C. §120 to U.S. application Ser. No. 13/130,818 filed on May 24, 2011 and patented as U.S. Pat. No. 8,541,094 on Sep. 24, 2013, which is the National Stage filing under 35 U.S.C. 371 of PCT Application Ser. No. PCT/US11/26610 filed on Mar. 1, 2011. The disclosure of the U.S. Patent and the PCT Application are hereby incorporated by reference in their entireties.

BACKGROUND

The present disclosure generally pertains to coatings and, more particularly, to coatings that may vary in reflectivity based at least in part upon temperature.

SUMMARY

Coatings are generally disclosed. Some example embodiments may include methods, apparatus, and/or systems pertaining to coatings that may be configured to change their ability to transmit and/or reflect light in response to changes in temperature. For example, some embodiments according to the present disclosure may pertain to coatings for surfaces, such as surfaces of structures, that may vary in reflectivity based at least in part upon temperature.

Some example coatings for substrates according to the present disclosure may be configured to change between a relatively higher reflectivity state and a relatively lower reflectivity state depending at least partially upon a temperature of at least a portion of the coating. Some example coatings may include a selectively reflective layer including a plurality of microcapsules. Individual microcapsules may include an ionic liquid and/or a surfactant within a shell. The microcapsules may have a relatively higher reflectivity when at temperatures above a cloud transition temperature and/or a relatively lower reflectivity when at temperatures below the cloud transition temperature. When at temperatures above the cloud transition temperature, the selectively reflective layer may reflect a first fraction of incident light. When at temperatures below the cloud transition temperature, the selectively reflective layer may reflect a second fraction of the incident light. The first fraction of the incident light may be greater than the second fraction of the incident light.

Some example methods according to the present disclosure may pertain to applying a coating configured to change between a relatively higher reflectivity state and a relatively lower reflectivity state depending at least partially upon a temperature of at least a portion of the coating. Some example methods may include applying a selectively reflective layer on a generally light-absorbent base layer. The selectively reflective layer may include a plurality of microcapsules disposed between a source of incident light and the generally light-absorbent base layer. Individual microcapsules may include an ionic liquid and a surfactant within a shell. The microcapsules may have a relatively higher reflectivity when at temperatures above a cloud transition temperature and a relatively lower reflectivity when at temperatures below the cloud transition temperature. When at temperatures above the cloud transition temperature, the selectively reflective layer may reflect a first fraction of the incident light. When at temperatures below the cloud transition temperature, the selectively reflective layer may reflect a second fraction of the incident light. The first fraction of the incident light may be greater than the second fraction of the incident light.

Some example selectively reflective construction materials according to the present disclosure may be configured to change between a relatively higher reflectivity state and a relatively lower reflectivity state depending at least partially upon a temperature of at least a portion of the material. Some example materials may include a base layer including a generally light-absorbent surface. A selectively reflective layer including a plurality of microcapsules may be disposed on the generally light-absorbent surface between a source of incident light and the generally light-absorbent surface. Individual microcapsules may have a relatively higher reflectivity when at temperatures above a transition temperature and a relatively lower reflectivity when at temperatures below the transition temperature. When at temperatures above the transition temperature, the selectively reflective layer may reflect a first fraction of the incident light. When at temperatures below the transition temperature, the selectively reflective layer may reflect a second fraction of the incident light, the first fraction of the incident light being greater than the second fraction of the incident light.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Methods, systems, devices, and/or apparatus pertaining to coatings that may be configured to change their ability to transmit and/or reflect light in response to changes in temperature are generally described. Some example embodiments according to the present disclosure may pertain to coatings for surfaces, such as surfaces of structures, that may vary in reflectivity based at least in part upon temperature.

Some example coatings according to the present disclosure may be configured to change between a relatively higher reflectivity state and a relatively lower reflectivity state depending at least partially upon a temperature of at least a portion of the coating. Some example coatings may include a selectively reflective layer including a plurality of microcapsules that may have a relatively higher reflectivity when at temperatures above a particular temperature and/or a relatively lower reflectivity when at temperatures below the particular temperature.

Some example coatings according to the present disclosure may be used on structures, such as buildings. For example, some coatings according to the present disclosure may be used as an exterior coating for a building. Some example coatings may react to the outside temperature to become less light-reflective on cold days and/or more light-reflective on warm days. At cooler temperatures, at least some incident light may pass through the coating and may produce a solar heating effect on the building. At warmer temperatures, the coating may reflect more light, thereby reducing the amount of light passing through the coating, which may allow relatively less solar heating. Thus, some example coatings may be used to reduce heating and/or cooling costs for the building.

As used herein, "reflectivity" may refer to the faction incident light that is reflected by a surface. In some example embodiments according to the present disclosure, a change in temperature of at least a portion of a coating may produce a change in the reflectivity of the coating.

Figure 1:
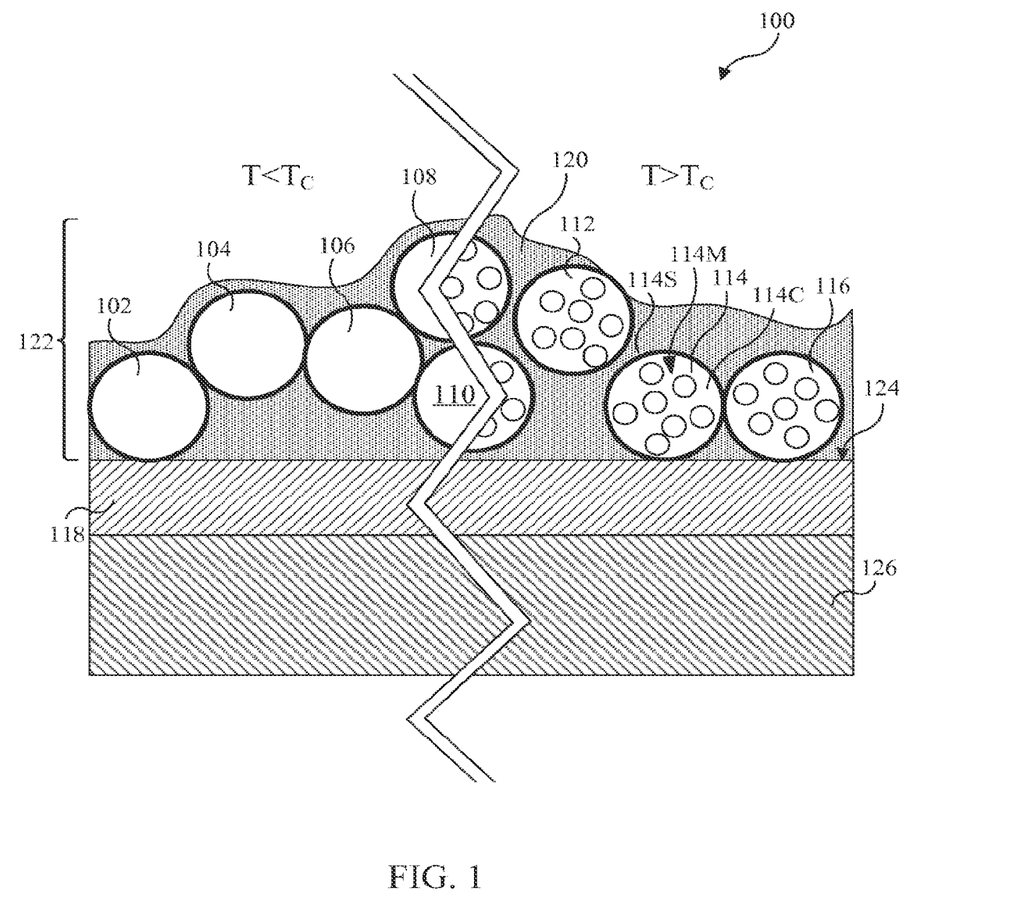
FIG. 1 is a cross-sectional view of an example temperature-controlled coating below and above a cloud transition temperature.

FIG. 1 is a cross-sectional view of an example temperature-controlled coating 100 below and above a cloud transition temperature, in accordance with at least some embodiments of the present disclosure. Coating 100 may comprise a selectively reflective layer 122, which may comprise a plurality of microcapsules 102, 104, 106, 108, 110, 112, 114, 116. Microcapsules 102, 104, 106, 108, 110, 112, 114, 116 may be adhered to each other and/or to a base layer 118 by a binder 120, which may be substantially transparent.

In some example embodiments according to the present disclosure, base layer 118 may be light-absorbent and may be disposed on a substrate 126. As such, the light-absorbent base layer may be disposed on the substrate 126. In some example embodiments, the substrate 126 may be thermally conductive. As such, the light-absorbent base layer may be disposed on thermally conductive substrate. In some example embodiments, the base layer 118 may be generally dark in color. The base layer 118 may comprise paint, which may be brushed, sprayed, and/or rolled onto the substrate 126. Similarly, in some example embodiments, the selectively reflective layer 122 may be brushed, sprayed, and/or rolled onto base layer 118. In additional examples, the selectively reflective layer 122 may be disposed on the base layer 118 that is light-absorbent by a process that includes brushing, spraying, and/or rolling, among others.

Microcapsules 102, 104, 106, 108, 110, 112, 114, 116 are described with specific reference to microcapsule 114; however, it is to be understood that other microcapsules 102, 104, 106, 108, 110, 112, 116 (and some other microcapsules according to the present disclosure) may be substantially similar to microcapsule 114. Microcapsule 114 may include an outer shell 114S, which may substantially surround a core 114C. Some example shells 114S may be formed from substantially transparent and/or substantially translucent materials, such as polysulfone and/or other thermoplastic polymers.

In some example embodiments according to the present disclosure, microcapsule 114 may have a size of about 100 μm to about 2 mm. In some example embodiments, microcapsule 114 may have a size of about 100 μm to about 200 μm.

In some example embodiments according to the present disclosure, core 114C may have temperature-sensitive properties. For example, in some example embodiments, core 114C may comprise an ionic liquid (IL) and/or a surfactant (e.g., a glycol ether). Below a cloud transition temperature ($T_C$), the ionic liquid and/or the surfactant may comprises a solution that is substantially transparent. As the temperature increases above $T_C$, the surfactant may separate out of the ionic liquid, such as because of a conformational change in the glycol polymer. The surfactant may form micelles 114M in the ionic liquid. Micelles 114M may have sufficiently large hydrodynamic diameters to scatter light, which may give core 114C a generally cloudy appearance. This phenomenon may be referred to as the "cloud point."

When the temperature of core 114C falls below $T_C$, micelles 114M may dissipate, which may return core 114C to a substantially transparent state. The left portion of FIG. 1 illustrates coating 100 at a temperature below $T_C$ (e.g., $T<T_C$), while the right portion of FIG. 1 illustrates coating 100 at a temperature above $T_C$ (e.g., $T>T_C$). In some example embodiments, core 114C in the generally transparent state may reflect substantially less light than when core 114C is generally cloudy. Thus, microcapsule 114 may change between a relatively higher reflectivity state and a relatively lower reflectivity state depending at least partially upon its temperature.

Generally, shell 114S, the ionic liquid, and/or the surfactant may be selected to be substantially non-volatile, substantially light-stable, and/or substantially oxygen-stable. Example ionic liquids include, but are not limited to, 1-butyl-3-methylimidazolium bis(trifluoromethylsulfonyl)imide, BmimBF4, EmimBF4, HmimBF4, EMI-OTf, EMI-Im, HMI-OTf, HMI-Im, and/or BMP-OTf. Example surfactants include, but are not limited to, poly(oxyethylene) alkyl ether H(CH$_2$)$_{14}$(OCH$_2$CH$_2$)$_6$OH, C$_{14}$E$_6$, C$_{14}$E$_5$, C$_{12}$E$_6$, and/or C$_{12}$E$_5$.

In some example embodiments, core 114C may comprise a surfactant that may be neither highly soluble nor insoluble in the ionic liquid. This may be achieved, for example, by using an ionic liquid such as BmimBF4 and/or a mixed alkyl/PEO surfactant such as C14E6.

In some example embodiments, the surfactant and ionic liquid may be provided in quantities of about 5% to about 95% ionic liquid and/or about 5% to about 95% surfactant. For a particular surfactant and a particular ionic liquid, $T_C$ may vary as the relative proportions of the surfactant and/or ionic liquid are varied. Thus, a desired $T_C$ may be achieved by adjusting the relative proportions of the surfactant and/or ionic liquid comprising core 114C.

In some example embodiments, core 114C may include a mixture containing two or more ionic liquids. For example, core 114C may include an ionic liquid mixture comprising about 50% EmimBF4 and/or about 50% HmimBF4. In such an example embodiment, EmimBF4 may be a relatively less effective solvent for the surfactant and/or HmimBF4 may be a relatively more effective solvent for the surfactant. Such mixtures of ionic liquids may provide the desired solvent characteristics, which may be useful for adjusting $T_C$ as desired.

In some example embodiments, core 114C may be configured such that $T_C$ is between about 10 degrees C. and about 50 degrees C. In a detailed example embodiment, $T_C$ may be between about 25 degrees C. and about 35 degrees C. Specific examples of $T_C$ include about 25 degrees C., about 27 degrees C., about 29 degrees C., about 31 degrees C., about 33 degrees C., about 35 degrees C., and temperatures between any two of these values. In a detailed example embodiment according to the present disclosure, $T_C$ may be about 30 degrees C.

Figure 2:
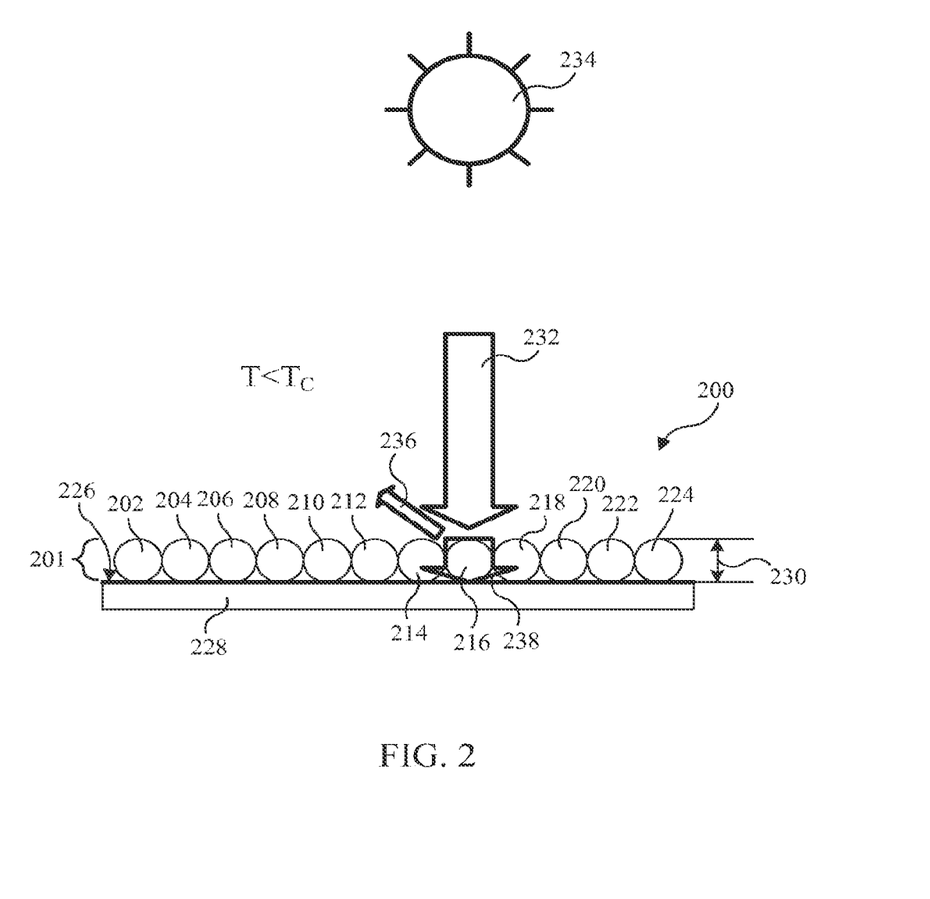
FIG. 2 is a cross-sectional view of an example temperature-controlled coating below a cloud transition temperature.

FIG. 2 is a cross-sectional view of an example temperature-controlled coating 200 below a cloud transition temperature, in accordance with at least some embodiments of the present disclosure. Coating 200 may be generally similar to coating 100 described above. Coating 200 may comprise a selectively reflective layer 201, which may comprise a plurality of microcapsules 202, 204, 206, 208, 210, 212, 214, 216, 218, 220, 222, 224. Selectively reflective layer 201 may be disposed between a source 234 of incident light 232 and a base layer 226, which may be provided on a substrate 228. For example, selectively reflective layer 201 may be disposed on base layer 226.

Coating 200 may have a thickness 230. In some example embodiments according to the present disclosure, thickness 230 may be about 100 µm to about 5 mm. In some example embodiments, thickness 230 may be about 200 µm to about 2 mm.

Incident light 232 from source 234 (e.g., the sun) may strike coating 200. Coating 200 may reflect a fraction 236 of incident light 232 and/or may transmit at least a portion 238 of incident light 232 to base layer 226. Because the temperature of coating 200 is less than about $T_C$, individual microcapsules 202, 204, 206, 208, 210, 212, 214, 216, 218, 220, 222, 224 may be substantially transparent, which may give coating 200 a substantially transparent appearance. In some example embodiments, when the temperature of coating 200 is less than about $T_C$, fraction 236 of incident light 232 that is reflected by selectively reflective layer 201 may be less than about 50%. In some example embodiments, when the temperature of coating 200 is less than about $T_C$, fraction 236 of incident light 232 that is reflected by selectively reflective layer 201 may be less than about 20%.

Figure 3:
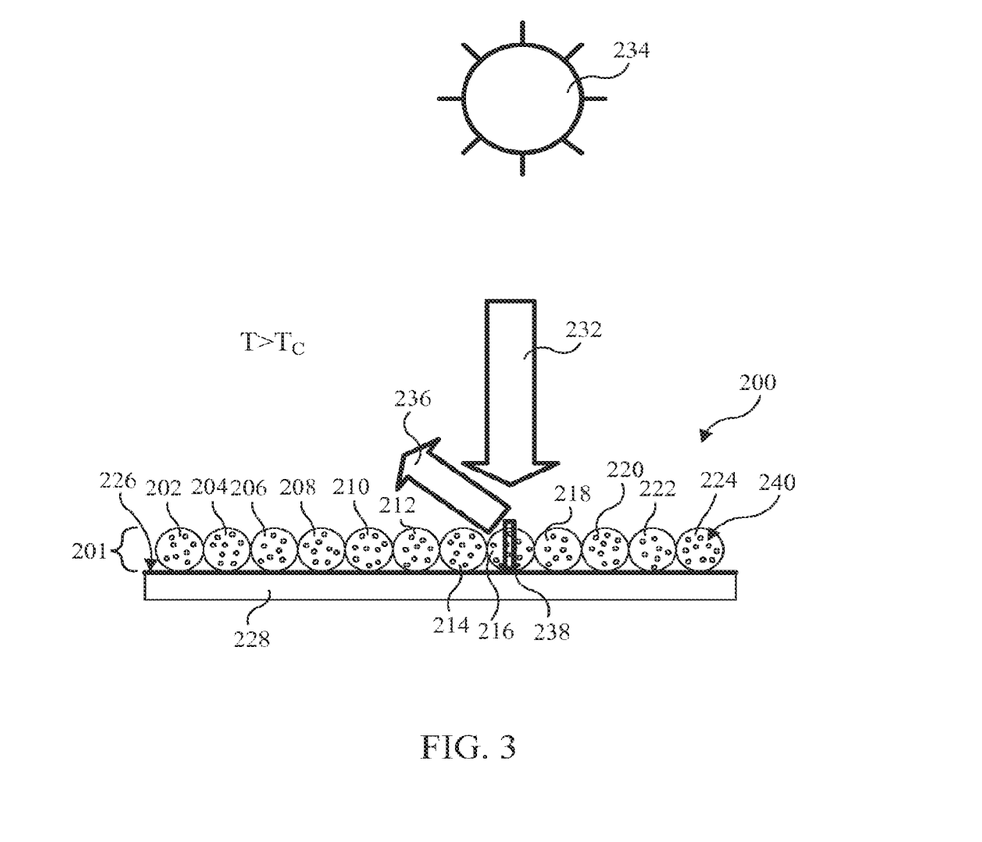
FIG. 3 is a cross-sectional view of an example temperature-controlled coating above a cloud transition temperature.

FIG. 3 is a cross-sectional view of example temperature-controlled coating 200 above a cloud transition temperature, in accordance with at least some embodiments of the present disclosure. Because the temperature of coating 200 is above about $T_C$, individual microcapsules 202, 204, 206, 208, 210, 212, 214, 216, 218, 220, 222, 224 may be substantially cloudy due to the presence of micelles 240. In some example embodiments, when the temperature of coating 200 is above about $T_C$, fraction 236 of incident light 232 that is reflected by selectively reflective layer 201 may be at least about 50%. In some example embodiments, when the temperature of coating 200 is above about $T_C$, fraction 236 of incident light 232 that is reflected by selectively reflective layer 201 may be at least about 80%.

Figure 4:
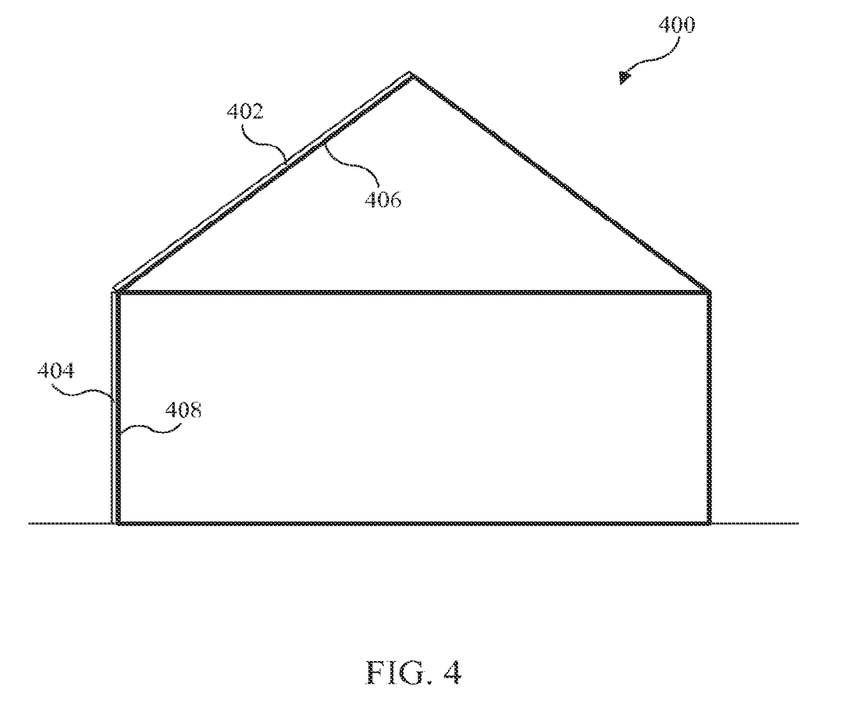
FIG. 4 is an elevation view of a structure including example temperature-controlled coatings.

FIG. 4 is an elevation view of a structure 400 including example temperature-controlled coatings 402, 404, in accordance with at least some embodiments of the present disclosure. Some example coatings 402 according to the present invention may be disposed on and/or comprise a roofing material 406 of structure 400. Some example coatings 404 according to the present disclosure may be disposed on and/or may comprise a part of a wall covering material 408 of structure 400. Roofing material 406, wall covering material 408, and/or other materials used to construct structures may be referred to as construction materials.

In some example embodiments according to the present disclosure, roofing material 406 and/or wall covering material 408 may comprise a substrate (e.g., generally similar to substrate 126 and/or substrate 228). In some example embodiments, roofing material 406 and/or wall covering material 408 may be installed on structure 400 after coatings 402, 404 have been at least partially applied to roofing material 406 and/or wall covering material 408. For example, rooting material 406 and/or wall covering material 408 may be installed on structure 400 after a generally light-absorbent base layer has been applied to the substrate and/or after a selectively reflective layer has been applied to the base layer.

In some example embodiments, roofing material 406 and/or wall covering material 408 may be installed on structure 400 before coatings 402, 404 have been fully applied to roofing material 406 and/or wall covering material 408. For example, roofing material 406 and/or wall covering material 408 may be installed on structure 400 before a generally light-absorbent base layer has been applied to the substrate and/or before a selectively reflective layer has been applied to the base layer.

Figure 5:
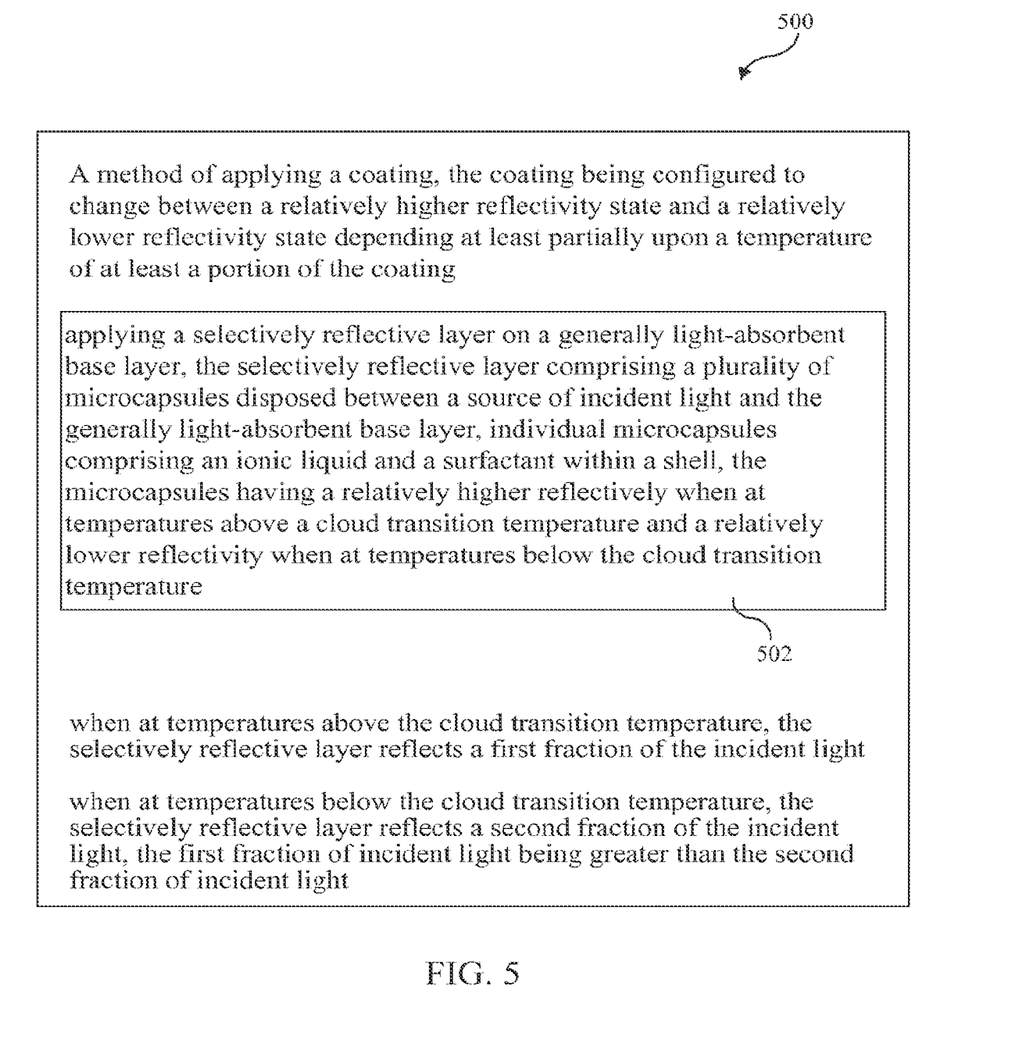
FIG. 5 is a flow chart illustrating an example method of applying a coating, all arranged in accordance with at least some embodiments of the present disclosure.

FIG. 5 is a flow chart illustrating an example method 500 of applying a coating, in accordance with at least some embodiments of the present disclosure. The coating may be configured to change between a relatively higher reflectivity state and a relatively lower reflectivity state depending at least partially upon a temperature of at least a portion of the coating. Method 500 may include operation 502, which may include applying a selectively reflective layer on a generally light-absorbent base layer, the selectively reflective layer comprising a plurality of microcapsules disposed between a source of incident light and the generally light-absorbent base layer, individual microcapsules comprising an ionic liquid and a surfactant within a shell, the microcapsules having a relatively higher reflectivity when at temperatures above a cloud transition temperature and a relatively lower reflectivity when at temperatures below the cloud transition temperature. In some example embodiments, when at temperatures above the cloud transition temperature, the selectively reflective layer may reflect a first fraction of the incident light. In some example embodiments, when at temperatures below the cloud transition temperature, the selectively reflective layer may reflect a second fraction of the incident light. In some example embodiments, the first fraction of the incident light may be greater than the second fraction of the incident light.

Some example coatings according to the present disclosure may allow some characteristics (e.g., color, texture, etc.) of a substrate to be visible through the coating. Generally, the visible appearance of some example coatings may be dependent primarily upon the underlying base layer. In some example embodiments, the exact hue and/or pattern of the building's surface may be selected by the building's architect while retaining the selectively reflective features of the coating.

Some example coatings according to the present disclosure may be applied to and/or may comprise parts of buildings besides wall covering materials and/or roofing materials. For example, some example coatings may be applied to and/or may comprise windows, skylights, and/or other similar construction materials. Further, some example coatings according to the present disclosure may be applied to and/or may comprise parts of vehicles (e.g., automobiles, boats, trains, etc.), such as wall covering materials, roofing materials, and/or window materials for vehicles.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A selectively reflective construction material comprising:
    a light-absorbent base layer; and
    a selectively reflective layer that includes microcapsules disposed on the light-absorbent base layer such that the selectively reflective layer is disposed between the light-absorbent base layer and a source of incident light,
        wherein the microcapsules have a higher reflectivity state when at temperatures above a transition temperature,
        wherein the microcapsules have a lower reflectivity state when at temperatures below the transition temperature,
        wherein, when at the temperatures above the transition temperature, the selectively reflective layer reflects a first fraction of the incident light,
        wherein, when at the temperatures below the transition temperature, the selectively reflective layer reflects a second fraction of the incident light, and
        wherein the first fraction of the light is greater than the second fraction of the incident light.

2. The selectively reflective construction material of claim 1,
    wherein each of the microcapsules includes an ionic liquid and a surfactant within a shell; and
    wherein the transition temperature is a cloud transition temperature of the ionic liquid and the surfactant.

3. The selectively reflective construction material of claim 2, wherein the surfactant includes a glycol ether.

4. The selectively reflective construction material of claim 2, wherein the cloud transition temperature is about 25 degrees C. to about 35 degrees C.

5. The selectively reflective construction material of claim 2, wherein the ionic liquid includes 1-butyl-3-methylimidazolium bis(trifluoromethylsulfonyl)imide.

6. The selectively reflective construction material of claim 2, wherein the shell includes a polysulfone.

7. The selectively reflective construction material of claim 1, wherein the light-absorbent base layer is disposed on a thermally conductive substrate.

8. The selectively reflective construction material of claim 1, wherein the selectively reflective construction material includes one or more of a roofing material or a wall material.

9. The selectively reflective construction material of claim 1, wherein the selectively reflective layer is disposed on the light-absorbent base layer.

10. The selectively reflective construction material of claim 1, wherein the light-absorbent base layer is dark in color.

11. The selectively reflective construction material of claim 1, wherein the selectively reflective layer includes a transparent binder.

12. A method to apply a coating to form a selectively reflective layer, the method comprising:
applying the coating on a light-absorbent base layer,
wherein the coating forms the selectively reflective layer includes microcapsules disposed on the light-absorbent base layer such that the selectively reflective layer is disposed between the light-absorbent base layer and a source of incident light, wherein the microcapsules have a higher reflectivity state when at temperatures above a transition temperature, wherein the microcapsules have a lower reflectivity state when at temperatures below the transition temperature
wherein, when at temperatures above a transition temperature, the selectively reflective layer reflects a first fraction of the incident light,
wherein, when at temperatures below the transition temperature, the selectively reflective layer reflects a second fraction of the incident light, and
wherein the first fraction of the incident light is greater than the second fraction of the incident light.

13. The method of claim 12, further comprising:
disposing the selectively reflective layer on the light-absorbent base layer by one or more of: brushing, spraying, and rolling.

14. The method of claim 12, wherein the light-absorbent base layer is disposed on a thermally conductive substrate.

15. The method of claim 14, further comprising:
installing the thermally conductive substrate on a structure before one or more of applying the light-absorbent base layer to the thermally conductive substrate or applying the selectively reflective layer onto the light-absorbent base layer.

16. The method of claim 12, wherein the microcapsules include an ionic liquid and a surfactant within a shell, and wherein components of the shell are selected from the group consisting of: substantially non-volatile, substantially light-stable, and substantially oxygen-stable.

17. A selectively reflective construction material comprising:
a light-absorbent base layer that includes a thermally conductive substrate; and
a selectively reflective layer that includes microcapsules disposed on the light-absorbent base layer such that the selectively reflective layer is disposed between the light-absorbent base layer and a source of incident light,
wherein the microcapsules include an ionic liquid and a surfactant within a shell,
wherein the microcapsules have a higher reflectivity state when at temperatures above a cloud transition temperature of the ionic liquid and the surfactant,
wherein the microcapsules have a lower reflectivity state when at temperatures below the cloud transition temperature of the ionic liquid and the surfactant,
wherein the selectively reflective layer reflects a first fraction of the incident light at the temperatures above the cloud transition temperature,
wherein the selectively reflective layer reflects a second fraction of the incident light at the temperatures below the cloud transition temperature, and
wherein the first fraction of the incident light is greater than the second fraction of the incident light.

18. The selectively reflective construction material of claim 17, wherein at the temperatures below the cloud transition temperature, the selectively reflective layer reflects less than about 20% of the incident light and when at the temperatures above the cloud transition temperature, the selectively reflective layer reflects at least about 80% of the incident light.

19. The selectively reflective construction material of claim 17, wherein at the temperatures below the cloud transition temperature, the ionic liquid and the surfactant include a substantially transparent solution.

* * * * *